US007415537B1

(12) United States Patent
Maes

(10) Patent No.: US 7,415,537 B1
(45) Date of Patent: Aug. 19, 2008

(54) CONVERSATIONAL PORTAL FOR PROVIDING CONVERSATIONAL BROWSING AND MULTIMEDIA BROADCAST ON DEMAND

(75) Inventor: Stephane H. Maes, Danbury, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/545,078

(22) Filed: Apr. 7, 2000

(51) Int. Cl.
G06F 15/16 (2006.01)
G06F 12/00 (2006.01)
(52) U.S. Cl. .................. 709/246; 709/217; 707/10
(58) Field of Classification Search ............ 709/246, 709/247, 217–219; 715/501.1, 517, 516, 715/523, 530; 379/88.14; 707/10
See application file for complete search history.

(56) References Cited

U.S. PATENT DOCUMENTS

| 5,297,191 | A | * | 3/1994 | Gerszberg | 379/59 |
| 5,614,940 | A | * | 3/1997 | Cobbley et al. | 725/138 |
| 5,721,827 | A | | 2/1998 | Logan et al. | |
| 5,889,951 | A | * | 3/1999 | Lombardi | 709/219 |
| 5,915,001 | A | * | 6/1999 | Uppaluru | 379/88.22 |
| 6,269,336 | B1 | | 7/2001 | Ladd et al. | |
| 6,317,582 | B1 | * | 11/2001 | Yoshinaga | 455/11.1 |
| 6,385,583 | B1 | | 5/2002 | Ladd et al. | |
| 6,424,945 | B1 | * | 7/2002 | Sorsa | 707/270.1 |
| 6,430,624 | B1 | * | 8/2002 | Jamtgaard et al. | 709/246 |
| 6,438,217 | B1 | * | 8/2002 | Huna | 379/88.14 |
| 6,490,564 | B1 | * | 12/2002 | Dodrill et al. | 704/275 |
| 6,501,832 | B1 | * | 12/2002 | Saylor et al. | 379/88.04 |
| 6,859,776 | B1 | * | 2/2005 | Cohen et al. | 704/270 |

FOREIGN PATENT DOCUMENTS

EP      1 100 013 A2 *    5/2001

(Continued)

OTHER PUBLICATIONS

IBM Research: Human Language Tech.; Multi-modal e-Business, Maes, S. (51 pages), no publishing available.*

(Continued)

*Primary Examiner*—Zarni Maung
(74) *Attorney, Agent, or Firm*—F.Chau & Associates, LLC

(57) ABSTRACT

A system and method for providing conversational (multi-modal) access to information over a communications network from any location, at any time, utilizing any type of client/access, through a conversational (multi-modal) portal. In one aspect, a conversational portal comprises a conversational (multi-modal) browser that is capable of conducting multi-modal dialog with client/access devices having varying input/output (I/O) modalities. The conversational browser retrieves information (such as content pages, applications) from an information source (e.g., content server) in response to a request from a requesting client/access device and then serves the retrieved information to the requesting client/access device in a format that is compatible with the I/O modalities of the requesting client/access device. In another aspect, the conversational portal provides multimedia access on demand. The conversational portal comprises an audio indexing system for segmenting and indexing audio and multimedia data obtained from an information source, as well as a multi-media database for storing the indexed audio and multi-media data. A subscribing user can compose and maintain a broadcast program wherein the user specifies which types, and in what order, different segments (news, radio, etc.) stored in the database are played back/broadcasted to the user.

32 Claims, 6 Drawing Sheets

| | FOREIGN PATENT DOCUMENTS | |
|---|---|---|
| JP | 09-083565 | 3/1997 |
| JP | 09-214559 | 8/1997 |
| JP | 09-321803 | 12/1997 |
| JP | 10-133973 | 5/1998 |
| JP | 11-136394 | 5/1999 |
| JP | 11-149448 | 6/1999 |
| JP | 11-250009 | 9/1999 |
| JP | 11-288403 | 10/1999 |
| JP | 11-306067 | 11/1999 |
| JP | 11-341051 | 12/1999 |
| JP | 11-345178 | 12/1999 |
| WO | WO 97/38389 | 10/1997 |
| WO | WO 99/21076 | 4/1999 |
| WO | WO 99/55049 | 10/1999 |
| WO | WO 99/57657 | 11/1999 |

OTHER PUBLICATIONS

Sci-Tech: IBM offers speech extension to XML, Sykes, R., Feb. 1999, 1-2 pages, source site: http://www.cnn.com.TECH/computing/9902/19/speechm1.idg/.*

Computer Dictionary, Microsoft Press, 3rd Ed., 1997, definition of "multimedia" on p. 319.*

Marc Abrams, et al., *UIML: An XML Language for Building Device-Independent User Interfaces*, XML Conference Proceedings, Dec. 1999.

Raymond Lau et al., *WebGALAXY; Beyond Point and Click: A Conversational Interface to a Browser*, Computer Networks and ISDN Systems, North Holland Publishing, Amsterdam, NL, vol. 29, No. 8-13, Sep. 1997.

European International Search Report.

* cited by examiner

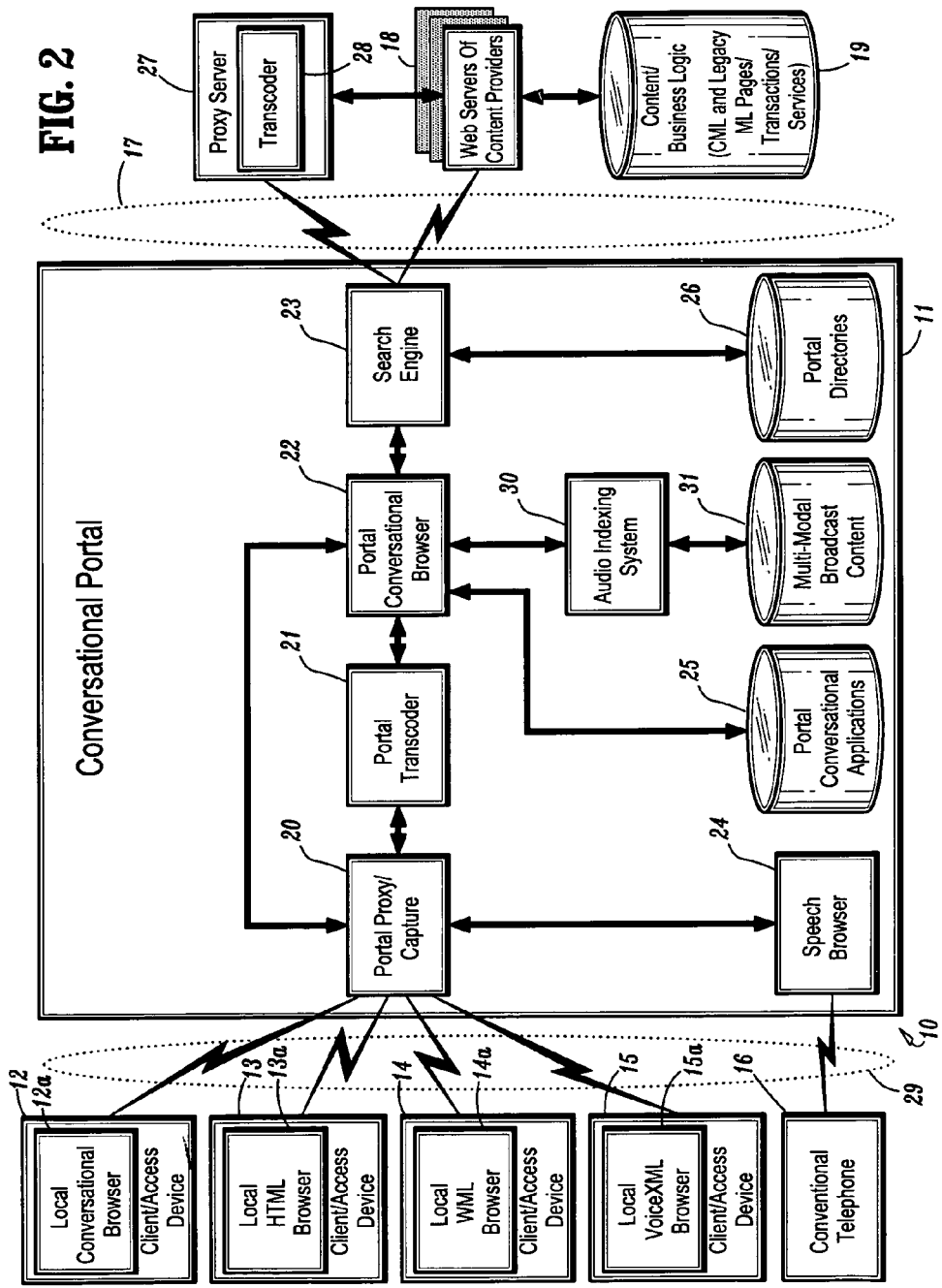

CONVERSATIONAL PORTAL FOR PROVIDING CONVERSATIONAL BROWSING AND MULTIMEDIA BROADCAST ON DEMAND

BACKGROUND

1. Technical Field

The present invention relates generally to systems and methods for accessing information over a communication network and, more particularly, to a conversational portal employing a conversational browser to provide services such as conversational browsing and multimedia access on demand.

2. Description of Related Art

The computing world is evolving towards an era where billions of interconnected pervasive clients will communicate with powerful information servers. Indeed, this millennium will be characterized by the availability of multiple information devices that make ubiquitous information access an accepted fact of life. This evolution towards billions of pervasive devices being interconnected via the Internet, wireless networks or spontaneous networks (such as Bluetooth and Jini) will revolutionize the principles underlying man-machine interaction. In the near future, personal information devices will offer ubiquitous access, bringing with them the ability to create, manipulate and exchange any information anywhere and anytime using interaction modalities most suited to the user's current needs and abilities. Such devices will include familiar access devices such as conventional telephones, cell phones, smart phones, pocket organizers, PDAs and PCs, which vary widely in the interface peripherals they use to communicate with the user. At the same time, as this evolution progresses, users will demand a consistent look, sound and feel in the user experience provided by these various information devices.

The increasing availability of information, along with the rise in the computational power available to each user to manipulate this information, brings with it a concomitant need to increase the bandwidth of man-machine communication. The ability to access information via a multiplicity of appliances, each designed to suit the user's specific needs and abilities at any given time, necessarily means that these interactions should exploit all available input and output (I/O) modalities to maximize the bandwidth of man-machine communication. Indeed, users will come to demand such multi-modal interaction in order to maximize their interaction with information devices in hands-free, eyes-free environments.

Unfortunately, the current infrastructure is not entirely configured for providing seamless, multi-modal access to information. Indeed, although a plethora of information can be accessed from servers over a network using an access device (e.g., personal information and corporate information available on private networks and public information accessible via a global computer network such as the Internet), the availability of such information may be limited by the modality of the client/access device or the platform-specific software applications with which the user is interacting to obtain such information.

By way of example, currently, there are various types of portals (or gateways) that may be accessed on various networks to obtain desired information. For instance, well-known WWW (world wide web) portals include Yahoo! (which is open to the Internet and open to users) and AOL (which is open to the Internet and allows subscribing users to access proprietary content). These portals typically include a directory of Web sites, a search engine, news, weather information, e-mail, stock quotes, etc. Unfortunately, typically only a client/access device having full GUI capability can take advantage of such Web portals for accessing information.

Other portals include wireless portals that are typically offered by telephone companies or wireless carriers (which provide proprietary content to subscribing users). These wireless portals may be accessed by a client/access device having limited GUI capabilities declaratively driven by languages such as WML (wireless markup language) or CHTML (compact hypertext markup language). These wireless portals, however, do not offer seamless multi-modal access such as voice and GUI, since a separate voice mode is used for human communication and a separate and distinct mode is used for WAP (wireless application protocol) access and WML browsing.

In addition, IVR services and telephone companies can provide voice portals (which provide proprietary content to subscribing users) having only speech I/O capabilities. With a voice portal, a user may access an IVR service or perform voice browsing using a speech browser. Unfortunately, a client/access device having only GUI capability would not be able to directly access information from a voice portal. Likewise, a client/access device having only speech I/O would not be able to access information in a GUI modality. Therefore, the bandwidth of man-machine communication is currently limited, for example, by the available I/O modalities of the client/access device and the format of the content stored in the server providing the information.

Other information sources that are currently available include the various service providers that provide access to radio and television (TV) programs (e.g., broadcasters, cable and satellite service providers). Many of these service providers offer interactive TV and broadcast programs on demand. The conventional methods for providing interactive TV and broadcast programs on demand, however, all rely on selection by the user of a particular program from a given set of catalogs. For example, a user can select to begin viewing a specific movie at a given time by individually ordering the movie. Alternatively, the user can join new broadcasts starting at certain time (e.g., every quarter hour).

With interactive TV, using services such as WebTV etc., the user can follow links associated with the program (e.g., URL to web pages) to access related meta-information (i.e., any relevant information such as additional information or raw text of a press release or pages of involved companies or parties, etc.). Other interactive TV uses include, for example, sending feedback to the broadcaster who can poll the viewer's opinion, selecting a video or film to view from a central bank of films, or modifying the end of the movie or program based on the viewer's request. Both WebTV and Interactive TV services utilize a set-top box or special set-top unit that connects to a television set. In addition, pay-per-view television, as well as TV services where viewers can vote (via telephone or the web) to select the next movie, can be considered as other forms of interactive TV. In all such cases, however, the level of personalization that may be achieved, for example, is very limited.

On the Internet, various web sites (e.g., Bloomberg TV or Broadcast.com) provide broadcasts from existing radio and television stations using streaming sound or streaming media techniques. Web broadcasts that use web-based video stream and audio streaming rely on pre-compiled video radio clip that the user can download and play a local machine such as a television or personal computer using, e.g., Realnetworks Player or Microsoft Windows Media Player. Indeed, in a WebTV interactive TV environment, the downloaded streamed program can be played on the TV.

In teletext systems, catalogs of ASCII meta information are downloaded with a TV program to the user's TV or set-top box. The user can then select desired items that are later downloaded. Eventually, new set-top boxes will offer the capability to store compressed versions of a program on a local hard disk or memory system to offer services such as pause or instant replay during a program.

Although the multimedia services described above allow users to download programs of interest, these services do not offer the user the capability to access a true broadcast on demand service, where the user is able to compose his radio or TV program based on his interest.

There is a need therefore for a system and method that provides multi-modal access to any information source (e.g., the WWW), from any location, at anytime, through any type of client/access device, so as to retrieve desired information and/or build a personalized broadcast program on demand, as well as manage and modify the program at any time.

SUMMARY OF THE INVENTION

The present invention is directed to systems and methods employing a conversational (multi-modal) portal to provide conversational (multi-modal) access to information over a communications network from any location, at any time, utilizing any type of client/access. In one aspect of the present invention, a conversational portal comprises a conversational (multi-modal) browser that is capable of conducting multi-modal dialog with client/access devices having varying input/output (I/O) modalities. The conversational browser retrieves information (such as content pages, applications) from an information source (e.g., a content server located on the Internet or an intranet/extranet) in response to a request from a requesting client/access device and then serves or presents the retrieved information to the requesting client/access device in a format that is compatible with the I/O modalities of the requesting client/access device.

In another aspect of the present invention, the content pages and applications provided by the content servers are multi-modal, implemented using CML (conversational markup language). In one embodiment, CML is implemented in a modality-independent format using a plurality of conversational gestures that allow the conversational interactions (multi-modal dialog) to be described independently of the platform, or the modality of the device or browser rendering/processing the content. The conversational portal can serve CML documents directly to an access device running a conversational browser for local processing/rendering of the CML documents.

In another aspect of the invention, the conversational portal provides multi-channel access to the content pages and applications by employing a transcoder that converts the modality-independent format (CML document) into at least one modality-specific format (e.g., HTML, VoiceXML) based on the detected I/O modalities of the requesting client/access device.

In yet another aspect, the conversational portal provides multimedia access on demand. The conversational portal comprises an audio indexing system for segmenting and indexing audio and multimedia data obtained from an information source, as well as a multi-media database for storing the indexed audio and multi-media data. In response to a user request, the conversational browser obtains desired segments from the multimedia database presents such segments to the client based on the I/O capabilities of the client. The conversational portal allows a subscribing user to compose and maintain a broadcast program wherein the user specifies which types, and in what order, different segments (news, radio, etc.) are played back/broadcasted to the user. The broadcast program on demand service offered by the conversational portal can be accessed from any location at any time, using any type of access device.

These and other aspects, features and advantages of the present invention will be described and become apparent from the following detailed description of preferred embodiments, which is to be read in connection with the accompanying drawings.

BRIEF DESCRIPTION OF THE DRAWINGS

FIG. 2 is a block diagram of system for accessing information via a conversational portal according to another embodiment of the present invention;

DETAILED DESCRIPTION OF PREFERRED EMBODIMENTS

Figure 1:
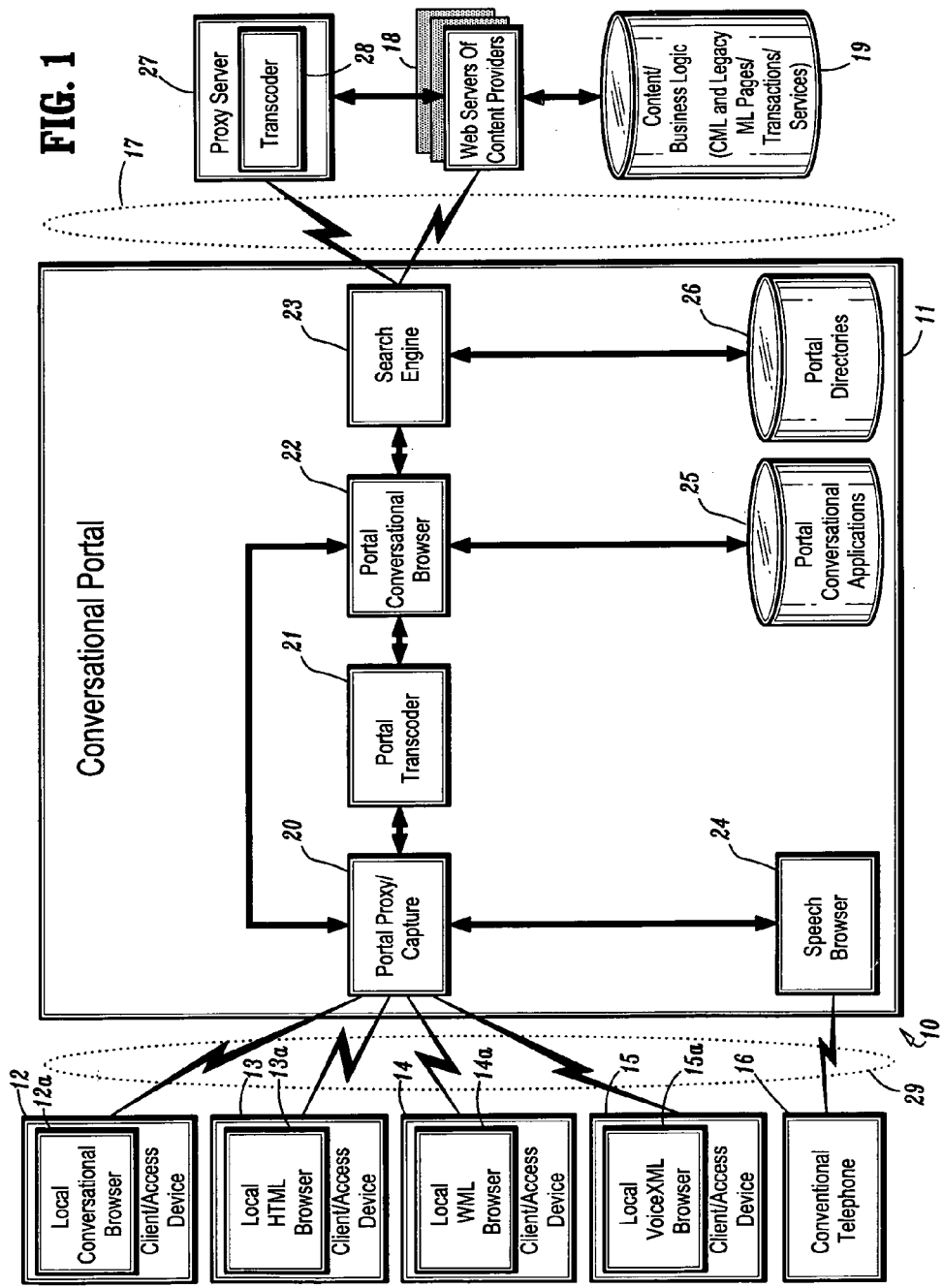
FIG. 1 is a block diagram of system for accessing information via a conversational portal according to one embodiment of the present invention.

The present invention is directed to systems and methods employing a "conversational portal" (comprising a "conversational browser") to provide "conversational access" to information over a computer network from any location, at any time, utilizing any type of client/access device. It is to be understood that the term "conversational" used herein refers to seamless multi-modal dialog (information exchanges) between user and machine and between devices or platforms of varying modalities (I/O capabilities), based on the capability of the access device/channel, preferably, using open, interoperable protocols and standards. Multi-modal dialog comprises modalities such as speech-only (e.g., VoiceXML), visual-only (GUI) (e.g., HTML (hypertext markup language)), restricted GUI (e.g., WML (wireless markup language), CHTML (compact HTML), HDML (handheld device markup language)), and a combination of such modalities (e.g., speech and GUI). In addition, each modality (or combination of modalities) may be implemented as a full NL (natural language) user interface, resulting in a universal conversational user interface (CUI).

The concepts of "conversational" interactions (or conversational computing) and "conversational browsing" are discussed in greater detail below as they relate to the exemplary embodiments described herein. Furthermore, detailed discussions of such concepts may be found, for example, in International Appl. No. PCT/US99/22927, filed on Oct. 1, 1999, entitled: "*Conversational Computing Via Conversational Virtual Machine*", International Appl. No. PCT/US99/22925, filed on Oct. 1, 1999, entitled: "*System and Method For Providing Network Coordinated Conversational Services*", and International Appl. No. PCT/US99/23008, filed on Oct. 1, 1999, entitled "*Conversational Browser and Conversational Systems*," all of which are commonly assigned, and fully incorporated herein by reference (each of these International Applications designate the United States and claim priority from U.S. Patent Application Ser. Nos. 60/102,957 filed Oct. 2, 1998 and 60/117,595 filed Jan. 27, 1999, which disclosures are also expressly incorporated herein by reference.

It is to be understood that the systems and methods described herein may be implemented in various forms of hardware, software, firmware, special purpose processors, or a combination thereof. In particular, the present invention is preferably implemented as an application comprising program instructions that are tangibly embodied on a program storage device (e.g., magnetic floppy disk, RAM, ROM, CD ROM, etc.) and executable by any device or machine comprising suitable architecture. It is to be further understood that, because some of the constituent system components and process steps depicted in the accompanying Figures are preferably implemented in software, the actual connections between such components and steps may differ depending upon the manner in which the present invention is programmed. Given the teachings herein, one of ordinary skill in the related art will be able to contemplate these and similar implementations or configurations of the present invention.

Referring now to FIG. 1, a block diagram illustrates a system 10 according to one embodiment of the present invention for providing conversational access to information over a computer network. In general, the system 10 comprises a conversational portal 11 that processes multi-modal requests received from one or more client/access devices 12-16 and, in response, fetches desired content pages, services, and applications over a network 17 (e.g., the Internet, an Intranet, a LAN (local area network), or an ad hoc network such as Bluetooth) from one or more content servers 18 (e.g., Web servers). The conversational portal 11 may comprise a web server and/or an IVR (interactive voice response) server that is associated with the service provider of the conversational portal 11. As described in detail below, the conversational portal 11 comprises a mechanism for conducting conversational dialog with a requesting client/access device based on the I/O modality(ies) of the client/access device.

Each client/access device 12-16 is capable of establishing communication over a network 29 (e.g., wireless, PSTN, LAN, Internet) to the conversational portal 11. It is to be appreciated that the conversational portal 11 may be accessed via a phone number or a URL, independently of the modality. For instance, depending on the configuration of the client/access device 12-16, connection may be made to the conversational portal 11 using a dial-up connection through a modem or through an ISP for WML (or an address that is accessible directly off a cell phone or other wireless device), an HTML browser client, a VoiceXML browser client via VoIP (voice over internet protocol), or other conversational protocols as described in the above-incorporated International Appln. Nos. PCT/US99/22927 and PCT/US99/22925. Similarly, a phone number (e.g., 800#) can be used to provide direct access to the conversational portal 11 for all these modalities (i.e., a direct phone call or ISP function offered directly by the conversational portal 11).

The content servers 18 maintain corresponding content/business logic 19 and perform appropriate database and legacy system operations (e.g., via CGI scripts, etc.). The content pages and applications in database 19 may be implemented in one or more legacy formats such as HTML, HDML, XML, WML, and any SpeechML format (such as the recent VoiceXML standard that has been proposed as a standard for declaratively describing the conversational UI for, e.g., speech browsers and IVR platforms.

In a preferred embodiment, the content pages and applications are multi-modal, implemented using a CML (conversational markup language). In general, CML refers to any language which specifies/builds a conversational dialog (multi-modal information exchanges and interactions) to be conducted with the user based on the desired application. A CML document may be any declarative page, for example, that comprises the information needed to build such interaction.

It is to be appreciated that CML documents and CML applications may be implemented in one of various manners. In a preferred embodiment, the CML content is implemented in a modality-independent, single authoring format using a plurality of "conversational gestures" such as described, for example, in U.S. Ser. No. 09/544,823, filed on Apr. 6, 2000, entitled: "*Methods and Systems For Multi-Modal Browsing and Implementation of A Conversational Markup Language*", which is commonly assigned and fully incorporated herein by reference. Briefly, conversational gestures are elementary dialog components that characterize the dialog interaction with the user and provide abstract representation of the dialog independently of the characteristics and UI offered by the device or application rendering the presentation material. Conversational gestures may be implemented either declaratively (e.g., using XML) to describe the dialog or imperatively/procedurally.

Advantageously, the use of conversational gestures (to generate content/applications) allows conversational interactions to be described independently of the platform, browser, modality or capability of the device processing or rendering the content. As described in detail below, a multi-modal documents such as a gesture-based CML document can be processed using a conversational (multi-modal) browser to provide tight synchronization between the different views supported by the multi-modal browser. Furthermore, using specific predefined rules, the content of a gesture-based CML document can be automatically transcoded to the modality or modalities supported by the particular client browser or access device. For instance, a CML document can be converted to an appropriate declarative language such as HTML, XHTML, or XML (for automated business-to-business exchanges), WML for wireless portals and VoiceXML for speech applications and IVR systems. Indeed, as described below, the conversational portal 11 comprises a mechanism for transcoding/adapting the CML page or application to the particular modality or modalities of the client/access device. Accordingly, it is to be appreciated that regardless of the set of conversational gestures used or the transcoding method employed, such an approach enables a true "multi-modal/multi-channel" conversational portal as described herein (i.e., "multi-modal" in the sense that the conversational portal 11 can serve multi-modal documents (such as gesture-based CML documents) to an access device running a conversational (multi-modal) browser to processing/rendering by the local conversational browser, and "multi-channel" in the sense that the conversational portal 11 can serve the content of multi-modal CML documents to legacy browsers (e.g., HTML, VoiceXML, WML) by converting CML to the supported modality.

In another embodiment, a multi-modal CML document may be implemented by incorporating a plurality of visual and aural markup languages (i.e., a CML document that comprises sub-documents from different interaction modalities). For example, a CML document may be implemented by embedding in a single document, markup elements from each of a plurality of represented/supported modalities (e.g., VoiceXML and HTML tags), and using synchronizing tags to synchronize the different ML content (i.e., to synchronize an action of a given command in one modality with corresponding actions in the other supported modalities) on an element-by-element basis. These techniques are described, for example, in the above-incorporated application International Appl. No. PCT/US99/23008, as well as U.S. Ser. No. 09/507,526, filed on Feb. 18, 2000, entitled: "*Systems and Methods For Synchronizing Multi-Modal Interactions*," which is commonly assigned and fully incorporated herein by reference.

The main difference between a gesture-based CML document and a CML document comprising multiple MLs is that the gesture-based approach offers single authoring whereas the multiple ML approach requires multiple authoring. In addition, the gesture-based approach provides "tight" synchronization in multi-modal browsing implementations, which is more difficult to achieve using the multiple ML approach (which often affords "loose" synchronization). In any event, multi-modal CML documents may be transformed to standalone documents for specific interaction modalities using, for example, standard tree transformations as expressible in the known standards XSLT or XSL. Other transcoding techniques may be used such as JSP (java server pages) or Java Beans that implement similar transformations of the CML pages on a gesture-by-gesture basis. Other standard transcoding techniques that may be implemented are well-known in the art. Indeed, the implementation of multi-modal documents, which can be transformed to documents of desired modalities, ensures content reuse and meets the accessibility requirements (e.g., a multi-modal document designed with combined visual and aural modalities can be used in environments where only one modality is available.

Referring again to the exemplary embodiment of FIG. 1, the conversational portal 11 comprises a portal proxy/capture module 20, a portal transcoder 21, a portal conversational browser 22, a search engine 23, a portal speech browser 24, a database of portal applications 25 and a database of portal directories 26. The portal conversational browser 22 is responsible for performing functions such as fetching the desired pages, etc., (using any conventional transport protocol such as HTTP, WAP, or Bluetooth) in response to client requests and parsing and processing the declarative framework (including any embedded procedural specifications such as applets) comprising a CML page, for example, to implement the conversational dialog between the given client/access device 12-16 and the conversational portal 11.

It is to be appreciated that the portal conversational browser 22 together with the CML implementation comprises a mechanism for translating conversational (multi-modal) I/O events into either (i) the corresponding application actions (in other modalities) or (ii) the dialogs that are needed to disambiguate, complete or correct the understanding of an input event to thereby generate the appropriate action. The portal conversational browser 22 will either render the conversational UI comprising the fetched pages for presentation to the user (assuming the access device does not comprise a local client browser) or serve the pages to the client/access device 12-16 for rendering/presentation by the local client browser.

Figure 4:
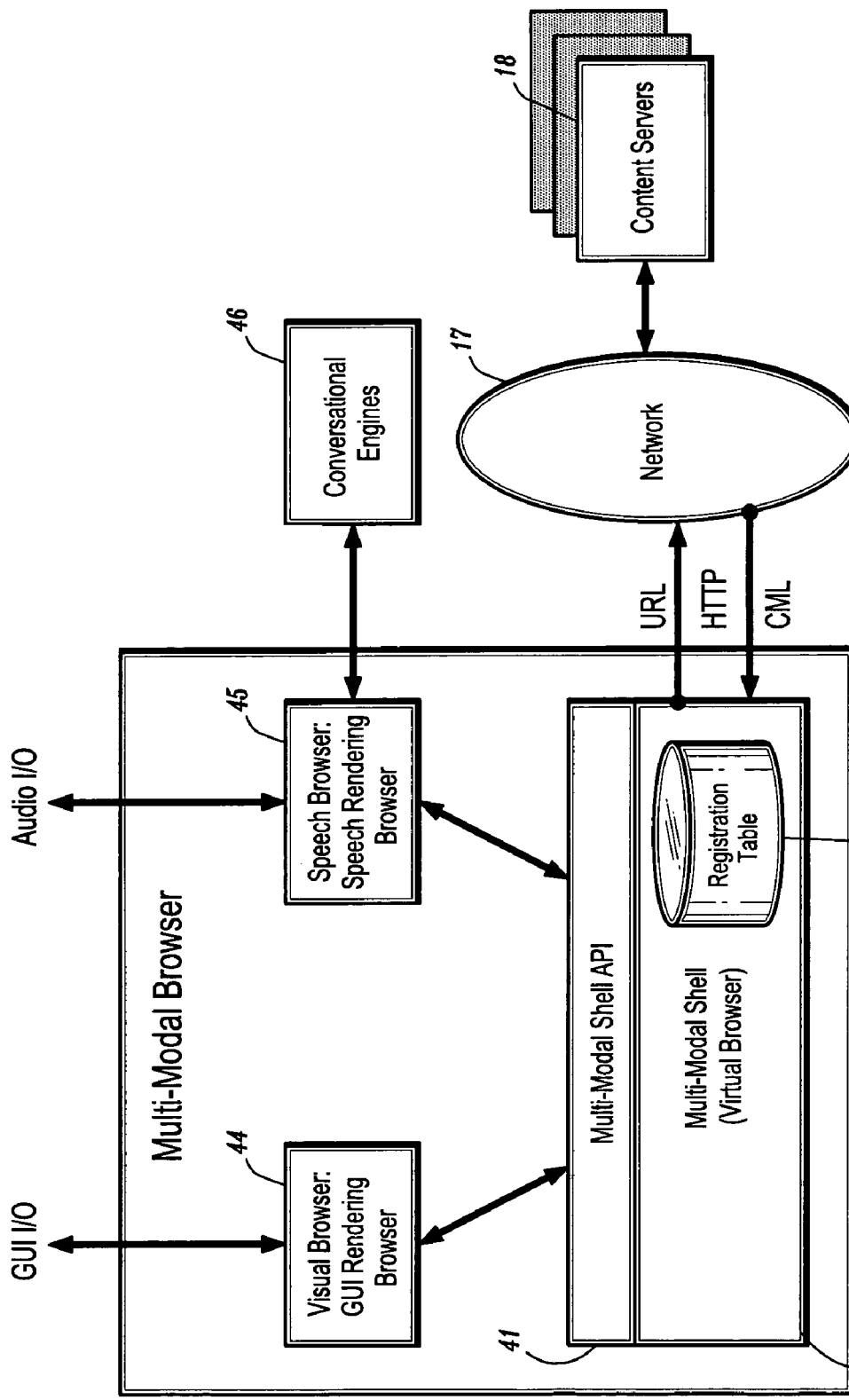
FIG. 4 is a block diagram of an architecture of conversational (multi-modal) browser that may be employed in connection with the present invention.

Although any suitable multi-modal browser may be implemented in the conversational portal 11, one preferred architecture for the portal conversational browser 22 is illustrated in FIG. 4 and described in detail in the above-incorporated U.S. Ser. No. 09/507,526. Briefly, as illustrated in FIG. 4, a conversational (multi-modal) browser 40 comprises a plurality of mono-mode browsers (e.g., a visual browser 44 (HTML) and a speech browser 45 (VoiceXMl) as shown), a multi-modal shell API 41 and a multi-modal shell 42 having a registration table 43 (the multi-modal shell 42 executes on top of any conventional operation system/platform). The multi-modal shell 42 functions as a virtual main browser which processes CML documents retrieved over the network 17 from a content server 18.

The multi-modal shell 42 coordinates the information exchange via API calls that allow each mono-mode browser application 44, 45 to register its active commands and corresponding actions (both inter and intra mode processes as well as actions on other processes). Such registration may include any relevant arguments to perform the appropriate task(s) associated with such commands.

The registration table 43 of the multi-modal shell 42 is a registry that is implemented as an "n-way" command/event-to-action registration table, wherein each registered command or event in the table indicates a particular action that results in each of the "n" modalities that are synchronized and shared for the active application. The multi-modal shell 42 parses a retrieved CML document to build the synchronization via the registration table 43 and send the relevant modality specific information (e.g., markup language) comprising the CML document to each browser for rendering based on its interaction modality (using the techniques described, for example, in the above-incorporated application U.S. Ser. No. 09/544,823. It is to be understood that although the conversational multi-modal browser 40 is illustrated comprising a separate browser application for each supported modality, as well as a separate multi-modal shell layer, it is to be appreciated that the functionalities of these components may be merged into one application comprising the conversational (multi-modal) browser 40. In addition, the components of the multi-modal browser may be distributed. For instance, the multi-modal shell 42 may reside on the conversational portal 11, whereas one of the browsers 44 and 45 (or both) may reside on a client access device, with the multi-modal shell 42 providing the CML parsing and synchronization.

Figure 5:
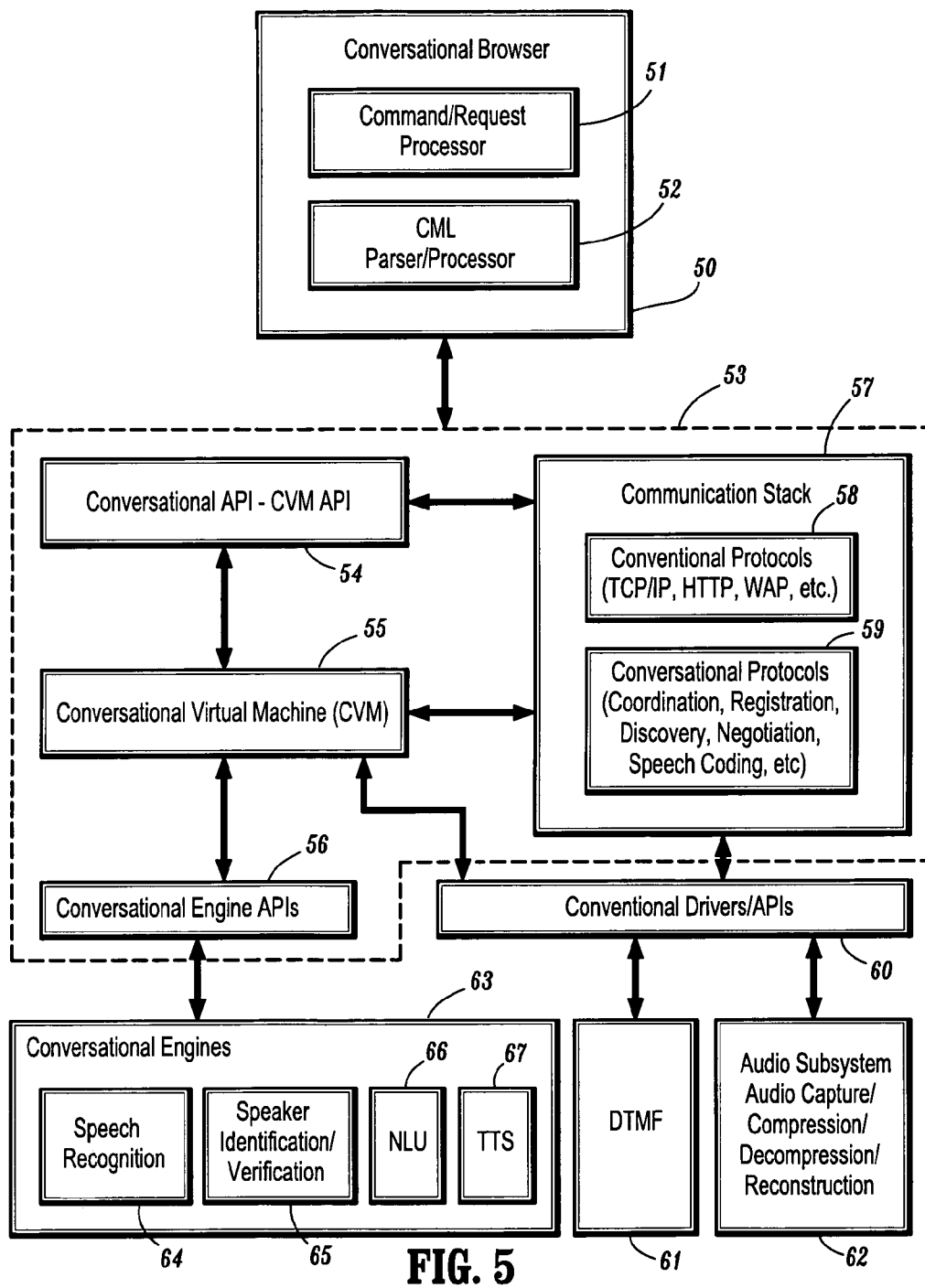
FIG. 5 is a block diagram of architecture of another conversational (multi-modal) browser that may be employed in connection with the present invention.

FIG. 5 illustrates another preferred architecture for the portal conversational browser 22 that may be employed utilizing a CVM (conversational virtual machine) when more complex conversational computing features are required, such as described in the above incorporated-applications International Appl. Nos. PCT/US99/23008 and PCT/US99/22927. In the embodiment of FIG. 5, the functionalities of the multi-modal shell 42 may be implemented in a core CVM kernel 55. A description of the architecture depicted in FIG. 5 is provided below.

Referring again to FIG. 1, the conversational portal 11 comprises a search engine 23 of any suitable conventional type comprising applications known as robots, spiders or crawlers which search the network 17 for content pages. Various content pages may be indexed within a searchable database of the search engine 23, i.e., the portal directories database 26. Upon receiving an interpreted query from the portal conversational browser 22 to perform a search, the search engine 23 will execute the query and search the network 17 and portal directories 26 to locate desired sites, content pages and broadcasts on the content servers 18 and returns a ranked list of possible matches in CML format (e.g., resulting sites are ranked by percentage of how close the site is to the topic that was searched as is understood by those in the art). The ranked list is rendered back to the user via, e.g., the portal conversational browser 22 for presentation to the user and selection by the user via conversational dialog.

It is to be understood that the search engine 23 will locate content pages in CML, HTML, XML or other legacy or new language formats (although the pages may be converted into different modalities based on the I/O capabilities of the requesting client/access device). It is to be understood that any conventional query format may be utilized by the search engine 23. For instance, the search engine 23 may support NLU queries, or simply keyword, Boolean and concept/attribute based queries, based on the technology available for the search engine. Furthermore, since the conversational portal 11 preferably provides a conversational user interface with CML, the search engine can support any possible I/O modality and combination of modalities. Multi-lingual searches can also be considered using the following method. Queries are mapped into symbolic representations (attribute value pairs). The attribute value pairs are used to perform a direct semantic translation (i.e. not necessary literal) to other languages. The new query is then used to perform the search of the documents in other languages.

In the "multi-channel" aspect where the conversational portal 11 supports multiple channels, the portal transcoder 21 will be utilized to transcode fetched documents (that are selected by the user) to the supported modality(ies) of the requesting client/access device. More specifically, based on the detected modality(ies) of the requesting client/access device, the portal transcoder 21 will transform a multi-modal document (e.g., a gesture-based CML document), which is parsed and output from the portal conversational browser 22, into one or more modality-specific formats.

By way of example, as shown in FIG. 1, a client/access device may be a local legacy browser such as an HTML browser 13*a*, WML browser 14*a*, or VoiceXML browser 15*a*, each running on a multi-modal or mono-modal device such as a personal computer (GUI and speech), mobile telephone (speech only or speech and limited GUI), smartphone (speech and limited GUI), PDA (limited GUI only), etc. In addition, the access device may be a conventional telephone 16 (speech I/O only) that interacts with the conversational portal 11 through the portal speech browser 24, wherein the portal speech browser 24 processes VoiceXML documents to provide IVR services, for example. Indeed, in the preferred embodiment where the content is stored/constructed in CML, it is to be appreciated that the conversational portal 11 can directly serve any of these channels or client/access devices by transcoding (on-the-fly) each CML page to the supported ML. For example, a CML document may be transformed into (1) HTML to support Internet access (via HTTP) using a traditional browser having a GUI modality; (2) WML to support wireless access (via WAP) over a wireless network using a WML browser; (3) VoiceXML to support traditional telephone access over PSTN using a speech browser; or (4) any other current or future MLs that may be developed.

The portal transcoder 21 employs one or more transcoding techniques for transforming a CML page to one or more legacy formats. For instance, such transformations may be performed using predetermined transcoding rules. More specifically, such transformations may be encapsulated in device-specific and modality-specific XSL stylesheets (such as described in the above-incorporated applications U.S. Ser. No. 09/507,526 and U.S. Ser. No. 09/544,823. Furthermore, as indicated above, other transcoding techniques may be used such as JSP or Java Beans that implement similar transformations of the CML pages on a gesture-by-gesture basis.

It is to be appreciated that the portal transcoder 21 performs other functions such as mapping back any user interaction in a given modality to the CML representation (for synchronized multi-modal interactions, the interaction in the one modality will then be reflected across all the other synchronized modalities). It is to be further appreciated that the functionalities of the portal transcoder 21 may be incorporated within the portal conversational browser 22. For instance, with the architecture of the conversational browser 40 of FIG. 4, the multi-modal shell 42 will perform functions such as dynamic transcoding of multi-modal documents to modality-specific representations and synchronization between the different modalities.

In the "multi-modal" aspect where the conversational portal 11 serves multi-modal CML pages for rendering by a local conversational (multi-modal) browser 12*a*, the portal transcoder 21 is not utilized since any required transcoding/synchronizing functions are performed by the local conversational browser 21*a* on the client side. Indeed, it is to be appreciated that in the case of the multi-modal client/access device 12 running a local conversational (multi-modal) browser 12*a* (having an architecture as described above with respect to FIG. 4), the conversational portal 11 will serve a fetched CML document directly to the local conversational (multi-modal) browser 12*a*, wherein the CML document is dynamically transcoded (via, e.g., the multi-modal shell) into different synchronized modalities (e.g., WML and VoiceXML documents that are tightly synchronized for a multi-modal WAP browser (i.e. micro-browser for the WML modality) or HTML and VoiceXML for a tightly synchronized conversational (multi-modal) browser comprising a speech browser (local or remote) and a HTML browser.

In both the "multi-channel" and "multi-modal" aspects, it is to be appreciated that the conversational portal 11 detects the channel and the capability of the client browser and/or access device to determine which modality (presentation format) to convert a CML document, if necessary. By way of example, the access channel or modality of the client/access device may be determined by (i) the type of query or the address requested (e.g., a query for a WML page implies that the client is a WML browser), (ii) the access channel (e.g. a telephone access implies voice only, a GPRS network access implies voice and data capability, and a WAP communication implies that access is WML), (iii) user preferences (a user may be identified by the calling number, calling IP, biometric, password, cookies, etc.) and/or (iv), in the case of the conversational browser client, registration protocols as described in the above-incorporated International Appln. Nos. PCT/US99/22927 and PCT/US99/22925.

The system 10 of FIG. 1 further comprises a conversational proxy server 27 having a transcoder 28, which may be used to transcode pages/applications of one or more sites of a given content provider from a legacy format into CML format (and/or other legacy formats). The proxy server 27 may be directly affiliated with, e.g., the content provider or a third-party contracted by the content provider, to transcode the site(s) of the content provider, store the transcoded site(s), and periodically update the stored (transcoded) content when the original site is modified by the content provider. For instance, a service provider of an HTML-based site may employ the transcoding services of the proxy server 27 to convert the HTML content of the site to a CML format. Such transcoding is particularly applicable for the client/access device 12 running a conversational (multi-modal) browser 12*a*, whereby a user can conduct multi-modal browsing when accessing sites comprising documents/applications that are strictly in conventional ML formats. In this manner, the conversational portal 11 can subsequently fetch such transcoded pages (e.g., CML pages) from the proxy server 27 as of such pages were fetched directly from the sites.

The use of the proxy server 27 allows the content provider to control the manner in which its content is rendered to the user (either by the portal conversational browser 22 or a client browser), as opposed to relying on unknown portal transcoders for converting the pages/applications of the content provider into one or more desired modalities. Indeed, it may be the case that the portal transcoder 21 lacks specific proprietary information about the particular legacy documents, applications and/or business logic of the content provider to adequately perform such conversion (which information is known only by the content provider or provided by the content provider to the contracted third-party).

It is to be understood that the transcoding services of the proxy server 27 may be performed using automatic transcoding techniques. For instance, the transcoder 28 may transcode conventional (legacy) structured document formats such as HTML, WML, or DB2 into a CML document using prespecified transcoding rules. Basic composition and design rules can be imposed (that are either proprietary the object of a standard) to simplify the conversion from legacy formats such as HTML to CML (such as the transcoding rules described in the above-incorporated International Appl. No. PCT/US99/23008 for converting HTML to a speechMl (VoiceXML)). It is to be understood that other techniques may be employed for transcoding HTML (or other legacy ML formats) to CML, such as using extraction of gestures and gesture patterns. For example, by reverse engineering transcoded pages produced from CML to HTML, a large set of HTML tag patterns can be mapped to specific CML gestures or groups of gestures. Details of the additional HTML tags can be either also transformed into CML patterns or added to the CML page as HTML tags embedded in the page. This last approach may be used for details that are not related to the gestures but directly related to additional modality-specific (in this example HTML) rendering information that is not worth capturing in a gesture (e.g. display of an image). In addition, the transcoder 28 may utilize meta-information that is added to legacy pages for transcoding purposes.

In addition, when the results of automatic transcoding by the transcoder 28 are incomplete or not accurate, or when the service provider of the proxy server 27 wants to increase the quality of the transcoding results, human operators can be employed to manually review, correct and/or complete the results of the transcoding. Indeed, until all web sites either are universally authored in CML, follow appropriate/standard construction rules, or add appropriate meta-information/hints to support fully automated transcoding, the manual review/transcode option is especially advantageous to efficiently and accurately model sites having complex business logic.

It is to be appreciated that, based on different business models, the conversational portal 11 can offer a service to content providers 18 to have their content pages/applications prepared or adapted in CML for better conversational rendering. For instance, the conversational portal 11 can offer (to registered web sites) the option of having their existing content pages/applications (in legacy formats) pre-transcoded to CML and stored in the portal directory database 26, so as to ensure that such pages can be subsequently served with quality rendering across different modalities. Such transcoding may be done via the proxy server 27 (assuming it is affiliated with the service provider of the conversational portal 11). In addition, such transcoding may be performed directly by operators of the portal obtaining information directly from the web site via a specific partnering/fee/business agreement. A mechanism can be employed (i.e. a crawler checking the original site or notification agreement when changes occur) to detect changes of the site and accordingly update the transcoded content in the site. Furthermore, as discussed above, when the results of automatic transcoding (via transcoder 28) are incomplete or not accurate, or when the service provider of the conversational portal 11 wants to increase the quality of the transcoding results, human operators can be employed to manually review, correct and/or complete the results of the transcoding. Pages that are reviewed and corrected may be stored in the portal directories 26. In addition, parts of pages or patterns may be stored in the portal directories 26.

Furthermore, the service provider of the conversational portal 11 can provide a service of generating, in the first instance, a "conversational" web site of company or individual and hosting the conversational web site on the conversational portal 11 hardware and/or network. Indeed, the conversational portal 11 service can generate a plurality of CML pages associated with the "conversational" web site and store such CML pages in the portal directory database 26. Again, it is to be understood that that the service provider of the conversational portal 11 may offer these various services based on different business models and service offerings.

Accordingly, the portal directory database 26 may store content pages/applications one or more content providers, which are either pre-transcoded or designed in CML to provide for efficient conversational rendering. During a search process, the search engine 23 will search for requested content in the portal directories 26 in addition to the web search. Furthermore, some of the links in the portal directories 26 can also include conversational applications 25 (e.g., multimodal procedural applications built on top of CVM). The conversational applications 25 are any regular application developed imperatively (i.e. by compiling imperative code), declaratively (i.e. built with markup languages) or a combination of both, to deliver an application with a "conversational user interface", i.e., to let the user access and manipulate the related information at any time, from any where through any device and with a same behavior, by carrying a modality independent dialog. Examples of such applications include universal messaging (accessing and processing e-mail, fax, and voice mail) via CUI, calendaring, e-business applications, etc.). It is to be appreciated that these portal conversational applications 25 may be directly offered by the service provider of the conversational portal 11 or hosted by the conversational portal on behalf of a company or individual. Again, all these services may be offered pursuant to various business models.

The portal proxy/capture module 20 is an optional feature that may be incorporated within the conversational portal 11 to "capture" a telephone call or browser connection (e.g., HTTP, WAP, etc.) made to the conversational portal 11. For example, in a preferred embodiment, when a client/access device 12-16 (e.g., a smartphone, HTML browser, WML browser, conversational browser) connects to the conversational portal 11 and enters a request, the conversational portal 11 will maintain the call/client browser captive for any link that is provided by the conversational portal 11 and followed by the user. More specifically, any link that is provided by the conversational portal 11 that results from either an initial request through the portal 11 or from a page that is subsequently loaded by the portal is fetched by the portal conversational browser 22 (as opposed to the client browser) and served to the client browser. The portal/proxy capture module 20 will hold the client captive during the time in which it takes to fetch the link, possibly transcode the link to the appropriate modality specific markup language (e.g., WML for a WAP browser, HTML for a web browser, VoiceXML for a speech browser (telephony access)), and serve any fetched page to the client browser (which can be the speech browser 24 on the server side in the case of a telephony access).

On the other hand, in the preferred embodiment, the pages that are directly requested/entered manually by the user (URL explicitly entered, bookmark, link generated by other applications) are relinquished to the client browser for fetching the appropriate pages by the client browser (i.e., the client browser is not held captive). It is to be understood that other policies may be employed with respect to the call capture feature, e.g., the conversational portal 11 may capture the call during an entire session (i.e., no release at all), or the capture period may vary based on the circumstances (as decided by the conversational portal 11).

Advantageously, during periods in which the call/client browser is held captive, the conversational portal 11 service can continuously listen/participate in the "conversation" and offer additional services and provide advertisements to the user. For instance, in a preferred embodiment, multi-modal advertisements can be provided to a "captive" user during the time period between page fetches from site to site (but not necessarily the time period between page fetches of the same application from the same server). Again, the time in which advertisements are provided may vary based on the policies of the conversational portal 11. It is to be appreciated that the advertisements are a pure multi-modal feature. Indeed, advertisements can be displayed, rendered using audio, or both, depending on the modalities of the client/access device. Moreover, in specific portions of a multi-modal document (rendered by a multi-modal browser), advertisements can be added in frames that are separate from the content. Again, there are various options that may be implemented by the service provider of the conversational portal.

Referring now to FIG. 5, a block diagram illustrates another preferred architecture of a conversational browser that may be employed in the system of FIG. 1. This architecture is described in greater detail in the above-incorporated International Appln. No. PCT/US99/23008. The conversational (multi-modal) browser 50 executes on top of a CVM shell 53. The conversational browser 50 comprises a CML parser/processor module 52 which parses a CML document and processes the meta-information of the CML document to render the document for presentation to the user. The conversational browser 50 further comprises a command/request processor 51 (e.g., a command and control interface and HTTP server) which interprets user commands/requests (multi-modal) such as speech commands, DTMF signals, keyboard input, etc. When certain conversational functions or services are needed, the conversational browser 50 will make API calls to the CVM 53 requesting such services (as described below). For instance, when interpreting a CML document (via the CML parser/processor 52), the conversational browser 50 may hook to a TTS (text-to-speech syntheses) engine 67 (via the CVM shell 53) to provide synthesized speech output to the user. In addition, when speech commands or natural language queries (e.g., navigation requests) are input, the conversational browser 50 may hook to a speech recognition engine 64 and NLU (natural language understanding) engine 66 to process such input commands, thereby allowing the command/request processor 51 to generate the appropriate requests/queries.

The CVM shell 53 can run on top of any conventional OS (operating system) or RTOS (real-time operating system). A detailed discussion of the architecture and operation of the CVM shell 53 is provided in the above-incorporated International Appln. No. PCT/US99/22927 (and related provisional applications). Briefly, as shown in FIG. 5, the CVM shell 53 comprises a conversational API layer 54 through which the conversational browser 50 can "talk" to a CVM kernel layer 55 to access (via system calls) certain conversational services and behaviors including the conversational engines 63. The CVM kernel 55 is responsible for allocating conversational resources such as engines and arguments (either local and/or distributed) and managing and controlling the dialog and context across multiple applications and devices (locally and/or distributed) on the basis of their registered conversational capabilities/requirements to thereby provide a universal and coordinated CUI (conversational user interface). The CVM shell 53 performs conversational services and functions by implementing calls to local conversational engines 63, e.g., a speech recognition engine 64, a speaker identification/verification engine 65, a NLU (natural language understanding) engine 66 a TTS (text-to-speech) engine 67 (as well as other engines such as an NLG (natural language generation) engine) through a conversational engine API layer 56 (such as SAPI, SRAPI, JSAPI, SVAPI or extensions of such engine APIs). In addition, engine calls can be made to remote speech engines in distributed topologies. Moreover, calls to an audio subsystem 62 (providing audio capture, compression, decompression and reconstruction) and DTMF engine 61) may be performed via a conventional drivers/API layer 60.

The CVM shell 53 further comprises a communication stack 57 for providing network communication via conventional protocols 58 such as TCP/IP, HTTP, WAP, etc. The communication stack 57 further comprises conversational protocols 59 (or distributed conversational protocols) which are utilized for distributed applications. As described in the above-incorporated applications, the conversational protocols (or methods) 59 include protocols for (1) discovering network devices and applications that are "conversationally aware" (i.e., that speak conversational protocols); (2) registering conversational capabilities (resources) such as conversational engines and arguments between network devices; (3) negotiating network configurations (such as master/slave, peer-to-peer) based on registered conversational capabilities; (4) exchanging information to coordinate a conversation between network connected devices such as information regarding the state, context and history of a dialog, conversational arguments, applets, ActiveX components, procedural objects, and other executable code; and (5) speech coding protocols to transmit and receive compressed speech (waveforms or features). These conversational protocols 59, as well as their role in providing conversational coordination between networked devices are described in further detail in the above-incorporated International Appl. No. PCT/US99/22925, for example.

It is to be understood that the engines 63, DTMF engine 61, conventional drivers/APIs 60 and audio subsystem 62 illustrated in FIG. 5 are components that are part of the underlying device, machine or platform on which the conversational browser 50 and CVM shell 53 are executed. It is to be further understood that the conversational browser 50 and CVM shell 53 can be provided as separate systems or, alternatively, the conversational browser 50 can be implemented as a stand-alone application carrying its own CVM shell 53 (in which case the browser and CVM platform would be the same, i.e., indistinguishable entities). In addition, in the absence of a CVM shell 534 as specifically described above, it is to be understood that the conversational browser 50 can incorporate all the functionalities and features of the CVM shell 53 as discussed (e.g. the conversational browser would make API calls to appropriate engines locally and/or distributed). Indeed, the API, services, features, behaviors, access to engine and communication mechanisms can all be built directly into, and made part of, the conversational browser 50 as part of the features and services provided by the browser.

Referring now to FIG. 2, a block diagram illustrates a system according to another embodiment of the present invention for accessing information using the conversational portal 11. The system 10 of FIG. 2, which is an extension of the system depicted in FIG. 1, additionally provides multi-modal broadcast on demand services. More specifically, the system of FIG. 2 comprises an audio indexing system 30 that performs, preferably, real-time indexing of audio/multimedia documents or streamed audio and/or streamed multimedia such as broadcast news, radio news programs, and web broadcasts that are accessed from certain content providers 18 over the network 17. Broadcasts can include audio and video productions ranging from news to entertainment (live or prerecorded). The index meta-information associated with, e.g., a given broadcast or multimedia document may be stored in a database 31 of multi-modal broadcast content. A user can connect to the conversational portal 11 using any type of client/access device and search the database 31 using the index meta-information to access, e.g., desired segments of certain broadcasts or audio files. Depending on the capabilities of the client/access device, either the portal conversational browser 22 can render/present any desired segments of streamed video or audio via, e.g., a plug-in such as a multimedia player (e.g., Realnetworks player or any other application that plays IP broadcast streams) or the segments may be retrieved and broadcasted/streamed to a client browser on the access device for rendering/playback to the user.

It is to be understood that any suitable conventional audio indexing system may be employed in the system of FIG. 2. A preferred audio indexing system is the system disclosed in U.S. Ser. No. 09/294,214, filed Apr. 16, 1999, entitled: "*System and Method for Indexing And Querying Audio Archives*," which is commonly assigned and incorporated herein by reference. Briefly, in one embodiment, the above incorporated audio indexing system 30 will segment and index an audio or multimedia file, or news or radio broadcast, based on, e.g., audio information such as speaker identity, environment, topic, and/or channel, for storage in the database 31. Initially, relevant features of an audio file or audio data stream (received in real-time) are extracted and processed to segment the audio data into a plurality of segments based on, for example, the speech of distinct speakers, music, noise, and different background conditions. For instance, a typical radio broadcast news report contains speech and non-speech signals from a large variety of sources including clean speech, band-limited speech (produced by various types of microphones) telephone speech, music segments, speech over music, speech over ambient noise, speech over speech, etc. For each segment, the audio indexing system 30 will identify the particular speaker and/or background environment/channel, as well as transcribe the spoken utterance and determine the relevant content/topic of the segment, so as to index the segments and detect their topic based on such data.

Accordingly, the database 31 may store any combination of the following meta-information for each multi-media document/stream: time marks (indicating the time boundaries of the segments), identity of the speaker (if meaningful), segmentation of changes of speakers (if applicable), a transcription of the spoken portions of the segments, environment information (music, telephony speech, etc.), the topic of a segment, boundaries of detected changes of topic, indexes and attribute value pairs/features (in the maximum entropy sense) of the segment/story, language and language boundaries.

In addition, the audio indexing system 30 comprises an information retrieval system (or search engine) that utilizes the index meta-information to search and retrieve desired segments of audio/multimedia files stored in the database 31. In particular, query parameters can include any combination of the different index meta-information such as speaker identity (ID tags), environment/channel, keywords/content and/or topics/NLU content, so as to retrieve desired segments from the database 31.

As indicated above, the conversational portal 11 can access the servers of content providers 18 to index, e.g., one or more broadcast news and radio news program in real-time. Such access may be in response to a user query that is issued upon connection with the conversational portal 11 to request a search in real-time for, e.g., relevant news segments about a given topic. For instance, the user can access the conversational portal 11 via, e.g., the conventional telephone 16 and issue a search request for, e.g., audio segments of current news regarding the stock market (which search request is interpreted via the speech browser 24 and/or portal conversational browser 22). The search engine 23 will then access relevant sites to retrieve one or more streamed broadcasts, which are then segmented and indexed via the audio indexing system 30. A ranked list of segments is rendered and presented to the user via conversational dialog through the speech browser 24 (assuming user access via the telephone) or the portal conversational browser 22. Through conversational dialog, the user can then select the desired segments for playback, and the speech browser 24 (or portal conversational browser 22 in the case of multi-modal content) plays back the relevant segments to the user, without necessarily storing (long-term) such segments) and indexing meta-information in the database 31 for subsequent access. It is to be appreciated that by using a multi-modal client/access device, the user can request multi-modal broadcast on demand to obtain audio-visual segments of interest and navigate the multi-modal presentation/stream/broadcast using a conversational/multi-modal user interface.

Furthermore, the content providers of such broadcasts may be affiliated with and otherwise registered with the service provider of the conversational portal 11 such that streaming audio/multi-media or other relevant documents (audio and multi-media) of such content providers are automatically downloaded and indexed (on a periodic basis) for subsequent access by authorized users of the conversational portal 11. In this manner, a user can connect with the conversational portal and issue a query to directly search the database 31 and retrieve one or more pre-indexed multi-media segments having desired content (in lieu of or in addition to a search over the network). The user can compose a broadcast program wherein the user may specify the order in which the different segments are played back/broadcasted and, for example, listen to the program on a cell phone or other connected device.

Furthermore, by periodically downloading and indexing multi-media documents and/or streaming data, the conversational portal 11 can provide a service of composing a personalized "listening and watching" program for a subscribing user based on user preferences (e.g., pre-selected topics or type of broadcast/documents/list of interest). The user may also compose a menu of what the user will listen to. Upon connecting to the conversational portal 11, the user can access the personalized program and playback desired content in any prespecified order. By way of example, a subscribing user may generate a personalized radio on demand program which the user can access over a wireless phone connected to the conversational portal 11. In addition, it is to be appreciated that during subsequent searches, the subscribing user may add to his/her personalized program any additional multimedia segments that are presented to the user in a search result list. At anytime during the program, the user can use the portal conversational browser commands to interrupt, pause or modify the program.

Figure 3A:
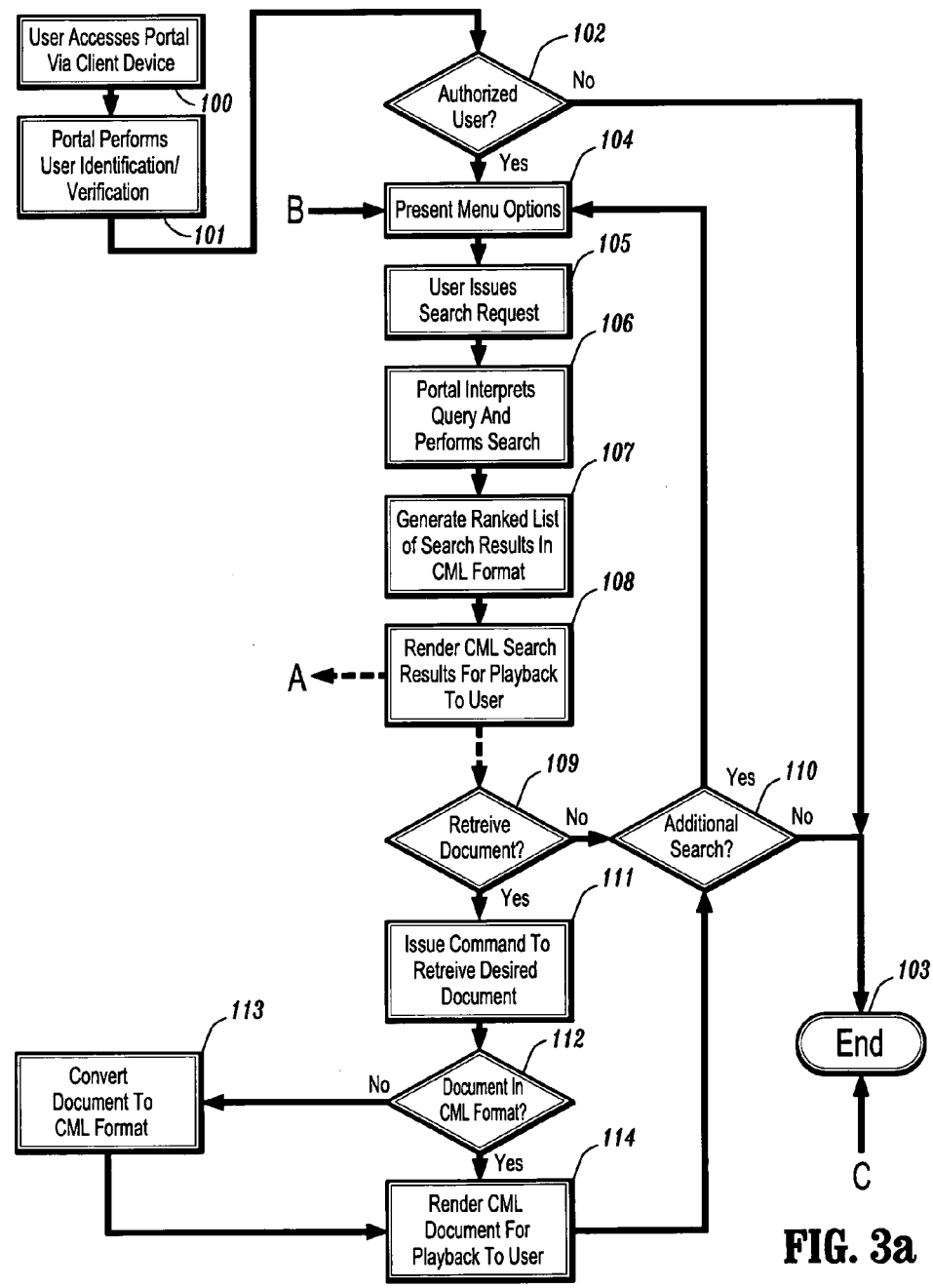
FIGS. 3a and 3b comprise a flow diagram of a method for accessing information according to one aspect of the present invention.
Figure 3B:
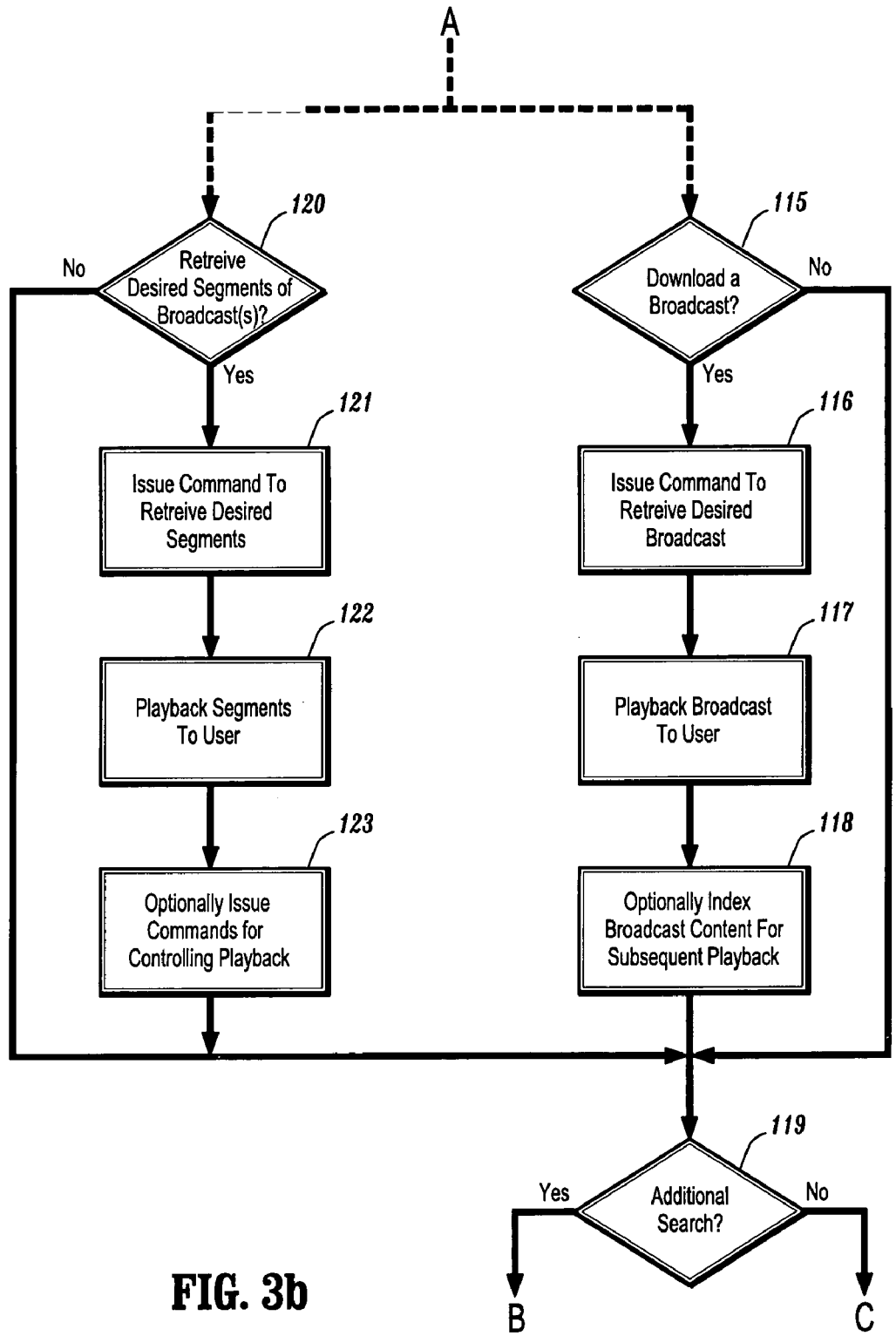

Referring now to FIGS. 3a and 3b, a flow diagram illustrates a method according to one aspect of the present invention for accessing information over a network using a conversational portal. Initially, referring to FIG. 3a, a user will access a conversational portal using any type of client/access device (step 100), e.g., calling an 800# using a telephone. In a preferred embodiment, upon connection with the conversational portal, a user identification/verification process is performed (step 101) to determine if the user is an authorized user of the conversational portal. It is to be understood that user identification is used in cases where personalization and/or login and billing is involved.

It is to be understood that any conventional form of security or logon procedure may be employed. In a preferred embodiment, a speaker identification and verification process is performed using the methods disclosed in the U.S. Pat. No. 5,897,616 issued Apr. 27, 1999 to Kanevsky, et al., entitled: "Apparatus and Methods For Speaker Verification/Identification/Classification Employing Non-Acoustic and/or Acoustic Models and Databases," which is commonly assigned and the disclosure of which is incorporated herein by reference. Briefly, this patent discloses a method for securing access to a service (such as the conversational portal) employing automatic speech recognition, text-independent speaker identification, and natural language understanding techniques, as well as other dynamic and static features. In one aspect, the authentication process includes steps such as receiving and decoding spoken utterances of the speaker, which contain indicia of the speaker such as a name, address or customer number; accessing a database containing information on candidate speakers; questioning the speaker based on the information; receiving, decoding and verifying an answer to the question; obtaining a voice sample of the speaker and verifying the voice sample against a model; generating a score based on the answer and the voice sample; and granting access to the user if the score is equal to or greater than a threshold.

Alternatively, speaker identification/verification may be performed via text-independent speaker recognition in the background of the dialog using the methods disclosed in the text-independent speaker verification process based on frame-by-frame feature classification as disclosed in detail in U.S. patent application Ser. No. 08/788,471, filed on Jan. 28, 1997, entitled: "Text Independent Speaker Recognition for Transparent Command Ambiguity Resolution And Continuous Access Control," which is commonly assigned and the disclosure of which is incorporated herein by reference.

When speaker identification, one way or another, is performed, the output may be processed as if it was a voice cookie. More specifically, a conventional cookie is a piece of code that a web site ships to a browser when it connects to the site. The cookie may contain information about the user's preferences, past usage, etc. It can also contain digital certificates. Accordingly, speaker ID and verification can be used to build equivalent information (a cookie) which can be stored in the portal conversational or speech browser on the server side. Thereafter, upon connection to the conversational portal, user identification may be performed transparently in the background using the cookie, which is equivalent to the presentation of a digital certificate. It is to be understood that as indicated above, the speaker identification process may be used for user customization where, for example, user-preferences are set upon identification and verification of the speaker (e.g., presentation formats, service access, billing subscription access, modality preferences, etc.) It is to be understood that any other login, identification, authentication procedure may be employed such as user ID, password, SIMS number of a GSM cell phone, conventional cookies in the access client (browser), etc.

If, after the login process, it is determined that the user is not authorized (negative determination in step 102), communication between the client and the portal will be terminated (step 103). If on the other hand, it is determined that the user is authorized (affirmative determination in step 102), the user will be presented with a plurality of menus (step 104) (via, e.g., synthesized speech) associated with the "home page" of the conversational portal. The initial menu options may include, for example, searching for content pages or services (CML or legacy pages/applications), accessing real-time and prerecorded broadcasts or any legacy information using transcoding services, and accessing personalized programs for searching broadcast segments of interest.

Depending on the available menu options and the type of information that the user desires, the user will issue the appropriate search request (step 105). The conversational portal 11 (via the portal conversational browser 22) will interpret the query and provide the interpreted query to the search engine 23 to perform the search accordingly (step 106). Again, based on the selected menu option, the requested search could be, for example, to retrieve certain WWW or CML content pages, broadcasts from broadcast-based web sites, or stored segments of indexed broadcasts. Depending on the type of search requested, the search engine 23 will search either the WWW, the portal speech directories 26, and/or the database of indexed broadcasts 31, and return in CML a ranked list of possible matches (step 107). The ranked list is then rendered back to the user via, e.g., the portal conversational browser 22 or speech browser 24 (step 108).

Assuming the user requested a search for a particular web document (or service), the ranked list will contain a list of web sites from which the user can select to download the document. If the user does not desire to retrieve a particular document from the list (negative decision in step 109), the user may either continue with an additional search (affirmative result in step 110 and return to step 104) or disconnect from the conversational portal (step 103). If, on the other hand, the user desires to retrieve a particular document from the list (affirmative decision in step 109), the user can issue an appropriate multi-modal command (voice or mouse click) to retrieve a desired document (step 111). The conversational browser will generate and transmit an appropriate request to download the desired document from the corresponding content server 18.

In the preferred embodiment, if the desired document is in a presentation format (e.g., HTML) other than CML (negative result in step 112), the document is transmitted to the appropriate transcoder to convert the document into an appropriate CML format (step 113), which is then rendered for playback to the user via a conversational browser (running on the client or server, or both (in a distributed topology) (step 114). As indicated above, the transcoder may reside, for example, in the conversational portal 11 server or a proxy server associated with, e.g., the content server from which the document is retrieved. Alternatively, in the case of a legacy client browser, the retrieved document may be transcoded to the appropriate modality (e.g., a CML or HTML document may be transcoded to a VoiceXML document for rendering on a client speech browser). It is to be understood that a retrieved document in a streaming audio/multi-media format is not converted to CML or any other legacy ML. If, on the other hand, the presentation format of the requested document is in CML, the document is transmitted directly to the conversational browser (client, server or both (distributed)) for rendering (step 114).

Returning again to step 108, assuming the user requested a search for a particular web broadcast (live or prerecorded broadcasts of radio or video presentations), the ranked list will contain a list of web sites that offer such broadcasts from which the user can select a desired broadcast (step 115, FIG. 3b). If the user does not desire to retrieve a particular broadcast in the list (negative decision in step 115), the user may either continue with an additional search (affirmative result in step 119 and return to step 104, FIG. 3a) or disconnect from the conversational portal (step 103, FIG. 3a). If, on the other hand, the user desires to download a particular broadcast in the list (affirmative decision in step 115), the user can issue an appropriate (multi-modal) command to download the desired broadcast (step 116). The portal conversational browser 22 will generate and transmit an appropriate request to connect to the content server providing the desired broadcast (step 117). Optionally, the user can issue an command to have the broadcast indexed (via the audio indexing system 30) for playback and search at a later time (step 118).

Returning again to step 108, assuming the user requested a search for certain prestored/indexed segments of web broadcasts, the ranked list will contain a list of available segments (audio/audio-visual) from which the user can select (step 120, FIG. 3b). If the user does not desire to retrieve any of the listed segments (negative decision in step 120), the user may either continue with an additional search (affirmative result in step 119 and return to step 104, FIG. 3a) or disconnect from the conversational portal (negative result in step 119 and return to step 103, FIG. 3a). If, on the other hand, the user desires to playback one or more segments in the list (affirmative decision in step 120), the user can issue an appropriate (multimodal) command to download the such segment(s) (step 121). Using appropriate plugins, the portal conversational browser 22 or speech browser 24 will playback the selected segments to the user (step 122). Optionally, using the appropriate plug-ins, the user can issue commands to control the playback of the segments (e.g., fast forward, rewind, search etc.).

In summary, the present invention advantageously affords conversational (multi-modal) access to the WWW, for example, from anywhere at anytime through any connected appropriate device so as to extract desired information and/or build a personalized broadcast program on demand, as well as manage and modify the program at any time. It is to be appreciated that the present invention provides multiple advantages over conventional systems. For instance, the present invention allows a user to perform multi-modal searches of real-time and prerecorded broadcasts and select segments on topics of interest for multi-modal playback. Another advantage is that it further allows a user to access documents and services in any format (CML or legacy) regardless of the I/O capabilities of the client/access device. Indeed, the retrieved pages may be in CML format or converted to CML format on- the-fly for rendering by a conversational (multi-modal) browser.

Furthermore, the present invention allows a user to generate programs that he/she will follow and allows the user to interrupt or modify the program at anytime. In addition, the user can search for alternatives while watching or listening to a given segment (background or off line search). Another advantage is that the present invention provides a service that allows a user, via, e.g., a single phone number, to access broadcast on demand from anywhere at anytime. Indeed, with the expansion of wireless networks, such service can be accessed via any wirelessly connected device. The conventional services described above do not offer such capabilities. Indeed, broadcast on demand and true interactive programming are long-standing need that until this invention was proposed has not been appropriately satisfied by any of the conventional systems described above.

Moreover, with respect to a business aspect of the present invention, there are a variety of viable business models. As indicated above, the conversational portal service can be subscription based, with revenue being generated from various channels. For instance, companies or content providers may register with the service provider of the conversational portal to be part of the manually managed portal directories 26 upon payment of an appropriate fee. In addition, revenue may be generated through user subscription, e.g., a flat rate or a fee per usage which then requires billing. Billing can then be performed knowing the user (ID of the connection browser, calling phone or biometric/verification or login to the conversational portal). In addition, payment/revenue for the conversational portal can be obtained directly via agreement with the channel carrier (e.g., telephony carrier, wireless carrier or ISP).

In addition, another business model is to have the conversational portal open to everybody for conversational access to content pages, service and broadcast content. In such a case, revenue may be generated from fees that are paid by subscribing users/companies for advertisements and/or other services provided by the conversational portal 11 on behalf of the subscribing user/company. For instance, the call capture option of the conversational portal can provide a direct revenue stream by providing advertisements (banners) in between fetches that are made via the portal (e.g., when a new search is performed).

Moreover, by continuously listening to the conversation (call capture), the conversational portal can be the primary mechanism by which the user can access other services (such as universal messaging, e-mail, directory assistance, map/traffic assistance etc.), wherein the service provider of such services will pay extra fee to be prominently available at that level (instead of being accessible through more advanced menu search from the portal). This "capture" mechanism of the conversational portal significantly increases the average time spent by the user on the portal (as opposed to conventional portals that interact with the user only during the short time that the user enters a query and decides to follow a resulting link to a new site). Also by offering such services (which are always accessible), the portal significantly increases the chances that the user when needing a service will connect to the conversational portal when access to one of the services is desired.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A conversational portal system, comprising:
 a computing system comprising a conversational browser to provide a user interface that adapts an interaction dialog between the conversational portal system and a client according to one more modalities supported by the client, and wherein the conversational browser can retrieve one or more pages from an information source in response to a request from the client and serve or present the retrieved pages to the client in at least one format that is compatible with the one or more modalities supported by the client, an audio indexing system for segmenting and indexing audio and multimedia data obtained from an information source of a registered subscriber; and a multimedia database for storing the indexed audio and multimedia data, wherein the conversational portal maintains, for the registered subscriber, a program comprising multimedia segments in the multimedia database searchable by the client via a direct query of the indexed audio and multimedia data in the multimedia database.

2. The conversational portal of claim 1, wherein the multi-modal format is a modality-independent format.

3. The conversational portal of claim 1, wherein the computing system further comprises a transcoder, operatively associated with the conversational browser, for converting a page having a multi-modal format into at least one modality-specific format.

4. The conversational portal of claim 1, wherein the conversational portal detects a modality of the client.

5. The conversational portal of claim 4, wherein the conversational portal detects the modality of the client based on one of registration protocols and identification of an access channel.

6. The conversational portal of claim 1, wherein the computing system further comprises a portal directory database, accessible by the conversational browser, for storing one of an index of information sources, information associated with information sources, and a combination thereof.

7. The conversational portal of claim 6, wherein the information, which is stored in the portal directory database associated with the information sources, is maintained in a multi-modal format by a service provider of the conversational portal under business agreements between the service provider of the conversational portal and service providers of the information sources.

8. The conversational portal of claim 1, wherein the computing system further comprises a capture module for capturing a connection between the client and the conversational portal and holding the client captive during predetermined time periods.

9. The conversational portal of claim 8, wherein the client is held captive between a time period where a link provided by the conversational browser is selected by the client and one or rendered and served to the client.

10. The conversational portal of claim 9, wherein the client is released when a link is directly requested by the client.

11. The conversational portal of claim 8, wherein the computing system provides one of advertisements, services and a combination thereof to the client, during at least one predetermined time period in which the client is held captive.

12. The conversational portal of claim 11, wherein the at least one predetermined time period is a time period between fetching links between different information sources.

13. The conversational portal of claim 11, wherein the advertisements and services are multi-modal.

14. The conversational portal of claim 11, wherein the advertisements and services are provided on behalf of a third-party under a business agreement between a service provider of the conversational portal and the third-party.

15. The conversational portal of claim 14, wherein the conversational browser obtains desired segments from the multimedia database in response to a client request and presents such segments to the client based on a modality of the client.

16. The conversational portal of claim 14, wherein the conversational browser periodically downloads multimedia data from at least one information source to index and store the multimedia data in the multimedia database.

17. The conversational portal of claim 16, wherein the downloading and indexing of the multimedia data of the at least one information source is performed under a business agreement between a service provider of the conversational portal and a service provider of the at least one information source.

18. The conversational portal of claim 1, wherein the registered subscriber can use the client to conversationally navigate the program and select desired segments for broadcasting.

19. The conversational portal of claim 1, wherein the program comprises radio on demand service which the registered subscriber accesses via a wireless phone client.

20. A system for accessing information, comprising:
an access device;
a content server; and
a conversational portal system comprising:
  a conversational browser that provides a conversational user interface to access the conversational portal system, wherein the conversational browser adapts an interaction dialog with the access device according to one or more modalities supported by the access device, and wherein the conversational browser can retrieve one or more pages from the content server in response to a request communicated from the access device and serve or present the retrieved pages to the access device in at least one format that is compatible with the one or more modalities supported by the access device;
  an audio indexing system for segmenting and indexing audio and multimedia data obtained from an information source according to a program specified by a user; and
  a multimedia database for storing the indexed audio and multimedia data,
  wherein the conversational portal maintains, for the user the program, wherein the program comprises portions of the indexed audio and multimedia data in the multimedia database in a predetermined order specified in the program by the user.

21. The system of claim 20, wherein the multi-modal format is a modality-independent format.

22. The system of claim 20, wherein the conversational browser can render a multi-modal content page or multi-modal application into a presentation format that is compatible with the at least one modality of the access device.

23. The system of claim 20, wherein the conversational portal system comprises a portal transcoder for converting a multi-modal content page or multi-modal application into at least one modality-specific representation based on a detected modality of the access device.

24. The system of claim 20, further comprising a proxy transcoder, accessible by the conversational portal system, for converting modality-specific content into a multi-modal representation.

25. The system of claim 24, wherein the proxy transcoder provides a transcoding service that is offered by a provider of the content or by a third-party under a business agreement with the provider of the content.

26. The system of claim 20, wherein the access device is a multi-modal device that executes a local conversational browser for processing and presenting one of a multi-modal content page and application received from the conversational portal.

27. The system of claim 20, wherein the conversational portal is accessed by calling a predesignated telephone number.

28. The system of claim 20, wherein the conversational portal comprises a portal directory database comprising a directory of content server addresses.

29. The system of claim 28, wherein the portal directory database comprises one of multi-modal content pages, multi-modal applications, and both associated with at least one content provider, which are hosted by the conversational portal.

30. A method for providing access to information over a communications network, comprising the steps of:

establishing communication with a conversational portal using an access device having at least one modality associated therewith;

the conversational portal adapting an interaction dialog with the access device based on the at least one modality of the access device, wherein adapting the interaction dialog includes adapting the interaction dialog to an audio modality and a non-audio modality;

maintaining, in a multimedia database of the conversational portal, indexed audio and multimedia data corresponding to a content page of a registered subscriber;

retrieving, by the conversational portal, the indexed audio and multimedia data of the content page from the multimedia database according to a user specified program specifying an order in which portions of the indexed audio and multimedia data are played; and presenting or serving, by the conversational portal, the content page to the user in at least one format that is compatible with the at least one modality of the access device, wherein the at least one format comprises a multi-modal format that can be rendered in two or more synchronized modalities.

31. The method of claim 30, further comprising the steps of:

detecting, by the conversational portal, at least one modality of the access device; and transcoding the retrieved content page into at least one modality-specific format corresponding to the at least one detected modality.

32. The method of claim 30, further comprising the steps of:

holding the user captive during a period in which the retrieving step is executed; and presenting one of advertisements, services and a combination thereof to the user during a predetermined time period in which the user is held captive.

* * * * *